May 19, 1925.

A. KOOIMAN 1,538,825

APPARATUS FOR DETERMINING THE DATA FOR THE LAYING OF GUNS INDIRECTLY

Filed April 23, 1924    2 Sheets-Sheet 1

Fig: 1

May 19, 1925.  1,538,825
A. KOOIMAN
APPARATUS FOR DETERMINING THE DATA FOR THE LAYING OF GUNS INDIRECTLY
Filed April 23, 1924   2 Sheets-Sheet 2

Patented May 19, 1925.

1,538,825

UNITED STATES PATENT OFFICE.

ARIS KOOIMAN, OF THE HAGUE, NETHERLANDS.

APPARATUS FOR DETERMINING THE DATA FOR THE LAYING OF GUNS INDIRECTLY.

Application filed April 23, 1924. Serial No. 708,539.

*To all whom it may concern:*

Be it known that I, ARIS KOOIMAN, a subject of the Queen of the Netherlands, residing at The Hague, Province of South Holland, Kingdom of the Netherlands, have invented certain new and useful Improvements in an Apparatus for Determining the Data for the Laying of Guns Indirectly, of which the following is a specification.

The invention relates to an apparatus for determining the data for the laying of guns indirectly. In applying the apparatus according to the invention the advantage is obtained that the apparatus may have very small dimensions, so that it may be used within a small space. This is important in view of the fact that the known devices require a considerable space to be operated.

In order that the invention may be clearly understood it will now be described with reference to the accompanying drawings of which:—

Figure 1:
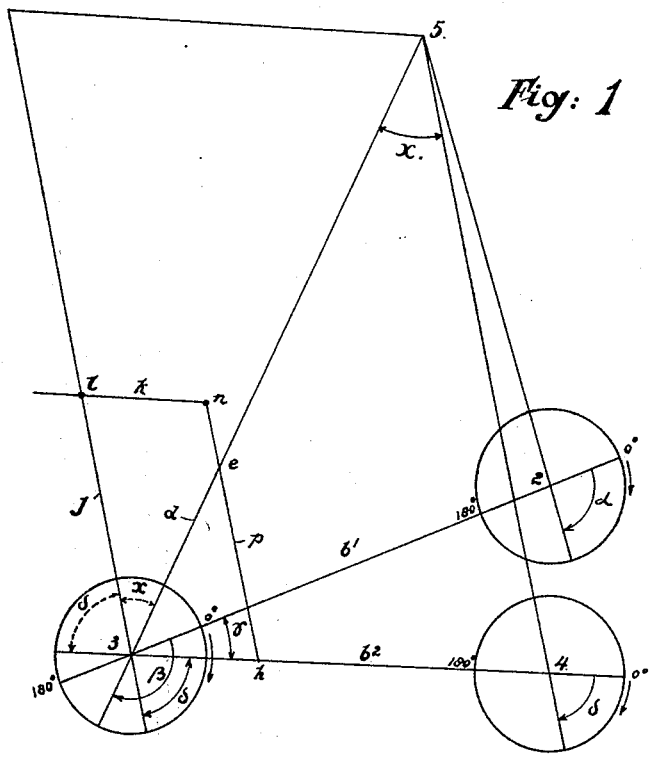
Figure 1 shows diagrammatically the method applied when using the apparatus according to the present invention.
Figure 2:
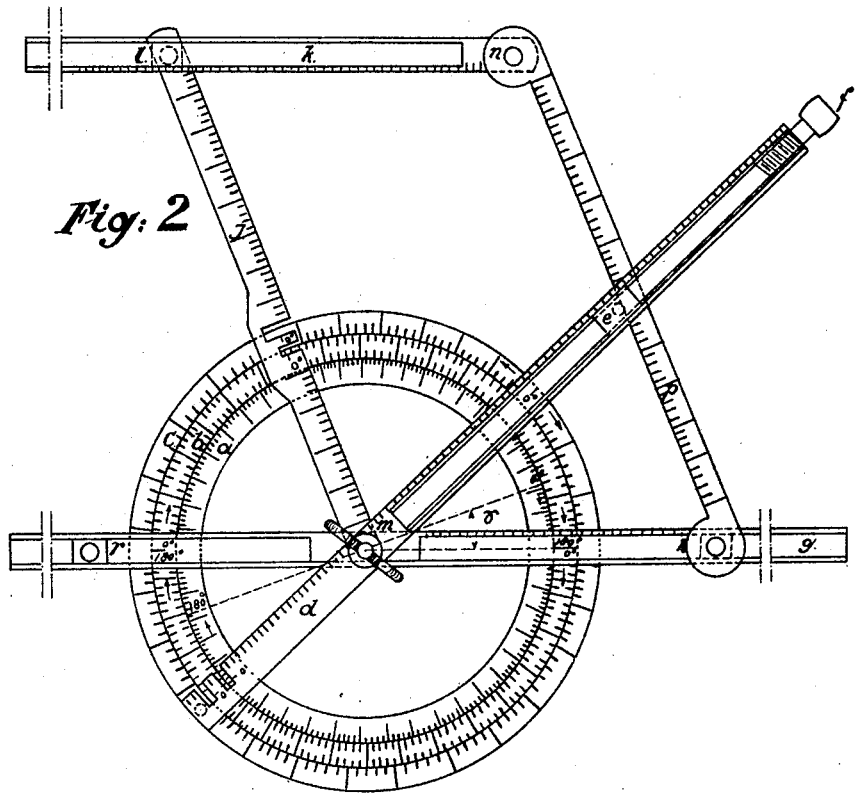
Figure 2 shows an apparatus constructed in accordance with this invention.

In order to calculate the data for indirect laying, it is necessary to have the co-ordinates of battery station 2 (Figure 1) of the station 3 situated to the left or to the right and each of the guns 4 ascertained accurately by triangulation (Figure 1). Then the bases 2, 3 ($b^1$) and 3, 4 ($b^2$) can be calculated, and by pointing with a calculated goniometer angle on a triangulated land-mark the goniometers in 2 and 3 can be adjusted, so that the lines 0°–180° coincide.

At the gun a free ring graduated in degrees, or, if the ring is fixed, a free pointer, must be provided so that 0° is read off when the axis of the bore is pointed at the vertical axis of the goniometer at 3.

In the case where this vertical axis is not visible from the gun the axis of the bore is pointed at a triangulated land-mark and the free ring or the free pointer turned so that an angle calculated in advance is read off.

In Figure 1 it is seen that to be able to point the gun 4 at the target 5 the angle δ and the range 4, 5 must be known.

This data can be ascertained with the apparatus constructed according to the present invention. The apparatus consists of two concentric graduated circular rings $a$ and $b$, the ring $a$ being movable but can be fixed to the ring $b$ in any desired position. A graduated circular ring $c$ is provided concentric with the rings $a$ and $b$ and has attached to it in the line 0°–180° a ruler $d$, the ring $c$ being adjustable by means of a worm-gear (not shown). The ruler $d$ has a guide way in which can be moved a block provided with a pin $e$, by turning the head $f$ of a miocrometer screw; the block is provided with a vernier (not shown) and the ruler $d$ with graduations (not shown). The lower end of the ruler $d$ permits of the reading of its position in regard to the ring $a$ and to the ring $b$.

To the ring $b$, in the line 0°–180° is attached a ruler $g$. This ruler is provided with graduations and has guide ways in which two blocks are adapted to slide, each square being provided with a vernier and with the pins $h$ and $r$ respectively can be fixed in any desired position.

A ruler $j$, can be turned about the centre $m$, like the ruler $d$, and is formed to permit the reading of its position in regard to the ring $b$ and to the ring $c$, just as with ruler $d$ by means of a vernier.

Another ruler $k$, provided with graduations and having guide ways in which a block with a vernier scale and a pin $l$ can be fixed to ruler $k$ in any desired position. By means of a pin $n$ this ruler is connected with the ruler $p$ and also by means of pin $l$ with the ruler $j$, and can turn with them.

Finally, a ruler $p$, can be connected with the pins $h$ and $n$, the distance between the holes receiving pins $h$ and $n$ being the same as that between those receiving pins $m$ and $l$.

To obtain the required data it is at first necessary to adjust the instrument in accordance with the situation of the station 3, which is done in the following manner. The pin $h$ is moved so that the distance $m$, $h$ corresponds on a chosen scale with the length of the base $b^2$, and the pin $l$ is moved, so that $n$, $l$ is equal to $m$, $h$; then the rulers $g$, $p$, $k$, $j$, form a parallelogram. The ring $a$ is turned so that the angle between its line 0°–180° and the line 0°–180° of the ring $b$ corresponds with the calculated angle δ (Figure 1), the ruler $d$ being used in the reading off. The apparatus is now adjusted at 4 for the station 3.

At regular intervals of time, station 3 communicates to 4 the azimuth and the range of the target. The ruler $d$ is placed on the corresponding mark of the ring $a$ and the pin $e$ of the ruler $d$ is placed on the given range; then the ruler $p$ is placed against the pin $e$. On the ring $b$ at the ruler $d$ the base angle 5—3—4 is now read off, as well as the top angle 3—5—4 on the ring $c$ at the ruler $j$.

From this data and the base-length $b^2$ the range 4, 5 is calculated simply and quickly with a circular slide-rule. On the ring $b$ at the ruler $j$ the angle $\delta$ is read off. By providing the ruler $p$ with graduations the range 4, 5 can be read from this ruler.

In the foregoing description only one gun is taken into consideration. The azimuth and range communicated by 3 can be used to calculate the azimuths and ranges to the target for guns situated to the left, as well as to the right of the lateral station 3, the apparatus being adjusted for the said lateral station in the manner described.

What I claim is:

1. Apparatus for providing the data for the laying of guns indirectly, consisting of three graduated concentric circular rings two of which are movable relatively about a common center, a main ruler to which the third ring is fixed, a slidable pin on the main ruler at each side of the ring center, other rulers coacting with the main ruler to form the sides of a parallelogram, one of the other rulers being pivoted to the main ruler at the ring center, the ruler opposite the last mentioned ruler being pivoted to one of said slidable pins, the ruler opposite the main ruler having pivoted and slidable connection with the adjacent rulers respectively whereby to adjust the length of the main ruler and the opposite ruler, both of the last mentioned rulers being graduated, a fifth ruler rotatably mounted on the common center and fixed to one of the movable rings, and a pin slidably mounted on the fifth ruler, substantially as and for the purposes set forth.

2. Apparatus for providing the data for the laying of guns indirectly, consisting of two graduated concentric circular rings, a main ruler to which one of said rings is fixed, a slidable pin on the main ruler on each side of the ring center, other rulers coacting with the main ruler to form the sides of a parallelogram, one of the other rulers being pivoted to the main ruler in the ring center, the ruler opposite the last mentioned ruler being pivoted to one of said slidable pins, the ruler opposite the main ruler having pivoted and slidable connection with the adjacent rulers respectively whereby to adjust the length of the main ruler and the opposite ruler, all of the rulers being graduated, a fifth ruler rotatably mounted on the common center and fixed to the other ring, and a pin slidably mounted on the fifth ruler, substantially as described and for the purposes set forth.

3. Apparatus according to claim 1, characterized in that the said main ruler is fixed to the intermediate of the three rings, whilst the rotatable ruler is fixed to the outer ring.

In testimony whereof I affix my signature.

ARIS KOOIMAN.

Certificate of Correction.

It is hereby certified that in Letters Patent No. 1,538,825, granted May 19, 1925, upon the application of Aris Kooiman, of The Hague, Netherlands, for an improvement in "Apparatus for Determining the Data for the Laying of Guns Indirectly," errors appear in the printed specification requiring correction as follows: Page 1, after line 28 insert the following paragraph:

*The apparatus according to this invention comprises three graduated concentric circular rings, two of said rings being relatively movable around a common center, whilst the third ring is fixed to a main ruler, which is provided with a slidable pin at each side of the ring center, extends in the direction of the line 0°–180° of the ring, forms together with other rulers the sides of a parallelogram and meets one of the other sides at the ring center, this other side being formed by a ruler pivotally mounted at the center of the rings, all of the rulers of the parallelogram being connected with each other by hinge joints and slide-connections being provided in order to adjust the length of two opposite sides of the parallelogram, one of these sides being constituted by said main ruler and both rulers being graduated, whilst furthermore a fifth graduated ruler is rotatably mounted on the common center and fixed to one of the two movable rings on the line 0°–180°, (thus not forming a side of the parallelogram) a pin being slidably mounted on this ruler. The said main ruler may be fixed to the intermediate of the three rings and the rotatable ruler fixed to the outer ring.;* same page, line 77, for the word "square" read *block;* and that the said Letters Patent should be read with these corrections therein that the same may conform to the record of the case in the Patent Office.

Signed and sealed this 8th day of December, A. D. 1925.

[SEAL.]

WM. A. KINNAN,
*Acting Commissioner of Patents.*